United States Patent [19]

Lange et al.

[11] Patent Number: 4,816,333

[45] Date of Patent: Mar. 28, 1989

[54] SILICA COATING

[75] Inventors: Roger W. Lange, Maplewood; Harold G. Sowman, Stillwater, Minn.; Soon-Kun Kang, Oakdale, all of Minn.

[73] Assignee: Minnesota Mining and Manufacturing Company, St. Paul, Minn.

[21] Appl. No.: 910,250

[22] Filed: Sep. 19, 1986

Related U.S. Application Data

[63] Continuation of Ser. No. 694,945, Jan. 25, 1985, abandoned.

[51] Int. Cl.$^4$ ............................ B32B 5/16; B32B 9/00
[52] U.S. Cl. .................................... 428/331; 428/329; 428/332; 428/404; 428/447; 428/451; 428/480
[58] Field of Search ............... 428/241, 206, 331, 372, 428/451, 447, 480, 913, 332, 404

[56] References Cited

U.S. PATENT DOCUMENTS

| | | | |
|---|---|---|---|
| 2,366,516 | 1/1945 | Geffcken et al. | 117/124 |
| 2,432,484 | 12/1947 | Moulton | 88/1 |
| 2,445,238 | 7/1948 | Nicoll et al. | 41/42 |
| 2,536,764 | 1/1951 | Moulton | 117/27 |
| 2,601,123 | 6/1952 | Moulton | 106/237 |
| 2,714,066 | 7/1955 | Jewett et al. | 95/8 |
| 3,301,701 | 1/1967 | Baker et al. | 117/118 |
| 3,380,876 | 4/1968 | Rusher | 428/331 |
| 3,396,046 | 8/1968 | Landau | 428/331 X |
| 3,485,658 | 12/1969 | Iler | 428/331 X |
| 3,674,531 | 7/1972 | Shephard et al. | 428/331 X |
| 3,706,589 | 12/1972 | Fukuda et al. | 428/331 X |
| 3,833,368 | 9/1974 | Land et al. | 96/3 |
| 3,914,469 | 10/1975 | Delano et al. | 427/164 |
| 4,177,315 | 12/1979 | Ubersax | 428/331 X |
| 4,190,321 | 2/1980 | Dorer et al. | 350/165 |
| 4,230,765 | 10/1980 | Takahashi et al. | 428/331 X |
| 4,271,210 | 6/1981 | Yoldas | 427/169 |
| 4,273,826 | 6/1981 | McCollister et al. | 428/304 |
| 4,346,131 | 8/1982 | Yoldas | 428/35 |
| 4,374,158 | 2/1983 | Taniguchi et al. | 427/41 |
| 4,409,285 | 10/1983 | Swerdlow | 428/332 |

FOREIGN PATENT DOCUMENTS 29561 of 1905 United Kingdom .

OTHER PUBLICATIONS

Cathro et al., Silica Low-Reflection Coatings for Collector Covers, by a Dip-Coating Process, Solar Energy, vol. 32, No. 5, 1984, pp. 573-579.
Cathro, K. et al. "Durability of Porous Silica Antireflection Coatings for Solar Collector Cover Plates" Solar Energy, vol. 27, No. 6, pp. 491-469, 1981.

Primary Examiner—Sharon A. Gibson
Attorney, Agent, or Firm—D. M. Sell; C. Truesdale

[57] ABSTRACT

A coated article having a substrate coated with a layer of silica particles is provided. The coating is substantially uniform in thickness, adheres aggressively to the substrate, and provides excellent antireflection properties to the substrate.

28 Claims, 2 Drawing Sheets

SILICA COATING

This is a continuation of application Ser. No. 694,945 filed Jan. 25, 1985 now abandoned.

BACKGROUND OF THE INVENTION

1. Field of the Invention

The present invention relates to silica coatings, articles, such as optical devices, bearing silica coatings thereon, and to processes for preparing such articles.

2. Background Information

Improvement in the transmittance of light through optical devices such as windows, solar collector cover plates, lenses and prisms has long been sought so as to increase their usefulness. Optical devices having surfaces coated with antireflecting layers, typically having an optical thickness of one quarter of a wavelength, are known. Also known are optical devices in which surface reflections are reduced by altering the surface to provide a gradient index of refraction between that of the medium traversed by the incident light, such as air and that of the body of the optical device.

One method for providing such an altered surface is disclosed in Great Britain Patent No. 29,561. It involves tarnishing glass surfaces in aqueous solutions of sulphuretted hydrogen in order to reduce the reflection of light therefrom. Such a method is not useful for producing an antireflection surface on polymeric substrates.

Another method for providing such an altered surface is disclosed in Nicoll (U.S. Pat. No. 2,445,238). This patent discloses a method for reducing reflection from glass surfaces in which the glass is heated in a vapor of hydrofluoric acid to form a skeletonized surface. Such skeletonized surfaces are difficult to reproduce and maintain.

Moulton (U.S. Pat. No. 2,432,484) discloses a technique for forming a non-gelling, nonuniformly dispersed layer of anhydrous colloidal particles on the surface of articles. The particles form a random arrangement of peaks on the article surface to provide antireflection characteristics.

Moulton (U.S. Pat. Nos. 2,536,764 and 2,601,123) discloses a transparent binder coating prepared using a dilute solution of tetraethylorthosilicate in organic solvent to render the colloidal particulate layer taught in the '484 patent resistant to wiping and handling, as such layers are inherently readily susceptable to injury.

Geffcken et al. (U.S. Pat. No. 2,366,516) disclose an antireflection layer formed by applying an aqueous dispersion of a gel-like low-hydrated oxide, such as silicon dioxide, to an object and heating the coated object to a temperature of 250° C. to form a hardened layer. Such a layer cannot be applied to most polymer substrates due to degradation of the substrate by heating to 250° C.

Baker et al. (U.S. Pat. No. 3,301,701) disclose rendering a glass base antireflective by coating with a finely divided silica substantially free of silica gel. Such a coating would be expected to be brittle, weak, and powdery.

Land et al. (U.S. Pat. No. 3,833,368) disclose antireflection coatings for photographic products which are an eighth-wave layer of a fluorinated polymer applied over an eighth-wave layer of silica, the silica layer having been formed from an aqueous colloidal silica sol.

Swerdlow (U.S. Pat. No. 4,409,285) discloses an antireflection coating for optical surfaces, the coating formed from silica and/or alumina particles in a polymeric binder with particles protruding from the surface of the binder. 20 to 98 weight percent of the particles have a size in the range of 7 to 50 nanometers (nm) and 5 to 65 weight percent of the particles have a size in the range of 75 to 150 nm.

Yoldas (U.S. Pat. Nos. 4,271,210 and 4,346,131) and McCollister et al. (U.S. Pat. No. 4,273,826) disclose anti-reflection coatings produced by coating a substrate with a metallo-organic compound, e.g. alkoxide, and heating the coated substrate at temperatures which decompose the organic components of the coating leaving a metal oxide layer on the substrate. The temperatures necessary to decompose the organic components would also decompose polymeric substrates.

Dorer et al. (U.S. Pat. No. 4,190,321) disclose an antireflective coating of a metal oxide in the form of discrete leaflets of varying heights and shapes. This coating is susceptible to damage during handling due to the fragility of the leaflet structure.

Cathro et al, (Silica Low-Reflection Coatings for Collector Covers, by a Dip-Coating Process, SOLAR ENERGY, Vol. 32, No. 5, 1984, pp. 573–579) disclose low-reflection silica coatings prepared from ethanol-based silica sols which are aged at pH 7. Aging causes an increase in optical density and viscosity due to the agglomeration of silica particles prior to coating. Although good adhesion of the coating to glass is said to be obtained by heating at elevated temperatures, adhesion to polymeric substrates is poor, i.e., the coating can be wiped from the surface of the substrate by rubbing with a tissue.

SUMMARY OF THE INVENTION

The present invention is directed to a coated article comprising a substrate, particularly a polymeric substrate, having a silica coating thereon. The coating comprises a continuous, gelled network of silica particles which preferably have an average primary particle size of less than about 200Å, more preferably less than about 70 Å when antireflection properties are sought. The coating is substantially uniform in thickness and is substantially permanently adhered to the substrate, i.e. has a 180° peelback value of at least about 150 g/cm, preferably at least about 500 g/cm.

The present invention is also directed to a process for applying coatings to substrates comprising coating a substrate with a solution containing about 0.2 to 15 weight percent colloidal silica particles, the particles preferably having an average primary particle size of less than about 200 Å, and drying the coating at a temperature less than that which degrades the substrate.

The coating adheres very well to a variety of substrates, particularly polymeric substrates, and can provide such substrates with excellent average reduction in specular reflectance, e.g., at least two percent. When the substrate is transparent, the coating can provide an average increase in transmission therethrough of normal incident light in the wavelength range of 400 to 800 nm over the transmission through an uncoated substrate of the same material. The increase in transmission is preferably at least two percent and up to as much as ten percent or more. The coating can also provide antistatic properties and reduced surface resistivity to substrates, such as polymeric film and sheet materials, subject to static build-up. The coating also preferably provides abrasion resistance and slip properties to polymeric materials, such as film and sheet materials, thereby improving their handleability.

DETAILED DESCRIPTION OF THE INVENTION

The article of the invention is a substrate bearing a continuous gelled network of silica particles. The particles preferably have an average primary particle size of less than about 200 Å. As used herein, the term "continuous" refers to covering the surface of the substrate with virtually no discontinuities or gaps in the areas where the gelled network is applied. The term "gelled network" refers to an aggregation of colloidal particles linked together to form a porous three-dimensional network. The term "porous" refers to the presence of voids between the silica particles. The term "primary particle size" refers to the average size of unagglomerated single particles of silica.

The articles of the invention comprise a substrate which may be of virtually any construction, transparent to opaque, polymeric, glass, ceramic, or metal, having a flat, curved, or complex shape and have formed thereon a continuous gelled network of silica particles. When the coating is applied to transparent substrates to achieve increased light transmissivity, the coated article preferably exhibits a total average increase in transmissivity of normal incident light of at least two percent and up to as much as ten percent or more, depending on the substrate coated, over a range of wavelengths extending at least between 400 to 800 nm. An increase in transmissivity can also be seen at wavelengths into the infrared portion of the spectrum.

The polymeric substrates may comprise polymeric sheet, film, or molded material such as polyester, polyimide, polystyrene, polymethylmethacrylate, polycarbonate, polysulfone, polyacrylate, and cellulose acetate butyrate.

Figure 1:
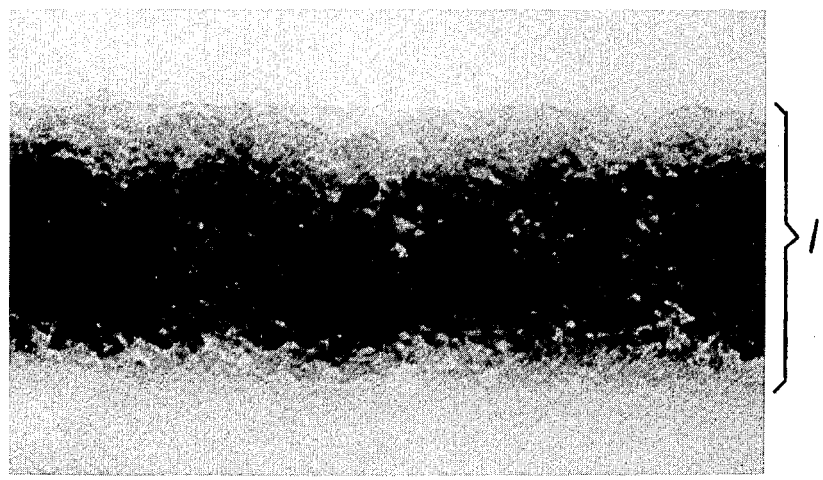
FIG. 1 is a transmission electron micrograph of a cross section of an article of the invention.

FIG. 1, a transmission electron micrograph of a coating 1 useful in the invention at a magnification of 300,000×, shows that the coating is continuous, i.e., covers the surface of the substrate with virtually no discontinuities or gaps, and provides a substantially smooth surface which has only minor surface imperfections. FIG. 1 further shows that the coating 1 is substantially uniform in thickness.

The coating useful in the invention is substantially permanently adhered to substrates to which it is applied, i.e., it can provide a 180° peelback value of at least about 150 g/cm when tested according to a modification of ASTM Test Method D3330. Generally, adhesion values of 500 g/cm can be achieved with failure at the adhesive layer and no coating removal from the substrate. In the modified test method, a 1.9 cm wide strip of Scotch Brand Magic transparent tape, available from 3M Company, is adhered to the test sample by rolling a 2 kg roller back and forth twice across the tape. The tape is then peeled from the test sample at 180° at a rate of 2 cm/min.

The excellent adhesion of the coating to the substrate and the adhesive of the test tape also demonstrates the utility of the coating as a primer for adhering adhesives to substrates, such as polymeric substrates, e.g., polyester films.

The gelled network provides a porous coating having voids between the silica particles. If the open porosity is too small, the properties of the coating, such as adhesion and antireflectance may be reduced. If the open porosity is too large, the coating is weakened and may have reduced adhesion to the substrate. Generally, the colloidal solution from which the gelled network is obtained is capable of providing an open porosity of about 25 to 70 percent, preferably about 30 to 60 percent when dried. The open porosity is determined by drying a sufficient amount of the colloidal solution to provide a dried product sample of about 50 to 100 mg and analyzing the sample using a "Quantasorb" surface area analyzer available from Quantachrome Corp., Syosett, NY.

The voids of the porous coating provide a multiplicity of subwavelength interstices where the index of refraction abruptly changes from that of air to that of the coating material. These subwavelength interstices which are present throughout the coating layer, provide a coating which may have a calculated index of refraction of from about 1.15 to 1.40, preferably 1.20 to 1.30 depending on the porosity of the coating. When the porosity of the coating is high, e.g., about 70 percent, lower values for the index of refraction are obtained. When the porosity of the coating is low, e.g., 25 percent, higher values for the index of refraction are obtained. The index of refraction of the coating is dependent on the relative volume ratios of the particles and the interstices and the index of refraction of the silica, i.e., 1.47. For purposes of this invention, the index of refraction (RI) is calculated using the formula:

$$RI = \frac{Po}{100} + \left(\frac{100 - Po}{100}\right)1.47$$

where Po is the value of the open porosity.

The average primary particle size of the colloidal silica particles is preferably less than about 200 Å to achieve good adhesion of the coating to the substrate. The average primary particle size of the colloidal silica particles is more preferably less than about 70 Å when antireflection properties are sought. When the average particle size becomes too large, the resulting dried coating surface is less efficient as an antireflection coating.

The dried coating is preferably from about 20 to 500 nm thick. Such coatings provide good adhesion and antistatic properties. When the coating thickness is too great, the coating has reduced adhesion and flexibility and may flake off or form powder under mechanical stress. When antireflection properties are sought, the dried coating thickness is preferably about 70 to 250 nm, more preferably 100 to 200 nm.

Articles such as transparent sheet or film materials may be coated on a single side or on both sides to increase transmissivity, the greatest increase being achieved by coating both sides.

The process of the invention comprises coating a substrate with a solution containing about 0.2 to 15 weight percent colloidal silica particles having an average primary particle size less than about 200 Å, preferably less than about 70 Å, and drying the coating at a temperature less than about 200° C., preferably in the range of 80° to 120° C.

Coating may be carried out by standard coating techniques such as bar coating, roll coating, curtain coating, rotogravure coating, spraying and dipping. The substrate may be treated prior to coating to obtain a uniform coating. Various known treatment techniques include corona discharge, flame treatment, and electron beam. Generally, no pretreatment is required.

The colloidal silica solution, e.g., a hydrosol or organosol, is applied to the substrate of the article to be coated and dried at a moderately low temperature, generally less than about 200° C., preferably 80°–120° C. to remove water or organic diluents. The coating may also be dried at room temperature, provided the drying time is sufficient to permit the coating to dry completely. The drying temperature should be less than that at which the substrate degrades. The resulting hygroscopic coating is capable of absorbing and/or rehydrating water in an amount of up to about 15 to 20 weight percent, depending on ambient temperature and humidity conditions.

The colloidal silica solution, finely divided solid silica particles of ultramicroscopic size in a liquid, utilized in the present invention, may be acid stabilized, sodium stabilized, or ammonia stabilized. It is generally helpful to acidify sodium stabilized silica sols to a pH of about 3.5 to 4.0, e.g., with glacial acetic acid, to prevent particle agglomeration prior to preparation of the coating solution when alcohol is used as a diluent. Examples of commercially available colloidal silicas useful in the invention include Nalco 2326 and Nalco 1034A, available from Nalco Chemical Co., and Ludox LS, available from E. I. duPont de Nemours Co., Inc.

The colloidal coating solution should contain about 0.2 to 15 weight percent, preferably about 0.5 to 6 weight percent, colloidal silica particles. At particle concentrations above 15 weight percent, the resulting coating may have reduced uniformity and exhibit reduced adhesion to the substrate surface. Difficulties in obtaining a sufficiently thin coating to achieve increased light transmissivity and reduced reflection may also be encountered at concentrations above 15 weight percent. At concentrations below 0.2 weight percent, process inefficiencies result due to the large amount of solvent which must be removed and antireflection properties may be reduced.

The thickness of the applied wet coating solution is dependent on the concentration of silica particles in the coating solution and the desired thickness of the dried coating. The thickness of the wet coating solution is preferably such that the resulting dried coating thickness is from about 20 to 500 nm thick.

The coating solution may also optionally contain a surfactant to improve wettability of the solution on the substrate, but inclusion of an excessive amount of surfactant may reduce the adhesion properties of the coating. Examples of suitable surfactants include Tergitol TMN-6 (Union Carbide Corp.) and Triton X-100 (Rohm and Haas Co.). Generally, the surfactant can be used in amounts of up to about 0.5 weight percent of the solution.

The coating ingredients may optionally contain a polymeric binder. Useful polymeric binders include polyvinyl alcohol, polyvinyl acetate, polyesters, polyamides, polyvinyl pyrrolidone, copolyesters, copolymers of acrylic acid and/or methacrylic acid, and copolymers of styrene. The coating solution can contain up to about 50 weight percent of the polymeric binder based on the weight of the silica particles. Useful amounts of polymeric binder are generally in the range of 0.5 to 10.0 weight percent.

Addition of various adjuvants, such as slip agents and processing oils, to the substrate material may reduce the adhesion of the coating to the substrate.

The following specific, but non-limiting, examples will serve to illustrate the invention. In these examples, all percentages and parts are by weight unless otherwise indicated.

EXAMPLE 1

Six grams of Nalco 2326 (ammonia stabilized colloidal silica; 14.5% colloidal silica as $SiO_2$; particle size 50Å; available from Nalco Chemical Company) was added to 100 g ethanol to provide a very clear coating solution. A 0.1 mm biaxially oriented polyethylene terephthalate film containing an ultraviolet absorber was dipped in the coating solution, air dried, and dried at 100° C. for two minutes. The resulting coating was porous, continuous, and similar to the coating shown in FIG. 1 in appearance. The coating thickness was about 120 nm.

The coating adhered aggressively to the substrate. A ¾ inch wide strip of Scotch Brand Magic transparent tape was applied to coated and uncoated film samples by hand pressure. A force of about 180 g/cm tape width was required to remove the tape from the uncoated sample, while a force of about 530 g/cm tape width was required to remove the tape from the coated sample, demonstrating a remarkable increase in the adhesion of the tape. The adhesive of the tape did not remove the coating from the coated film, but exhibited adhesive split of the adhesive layer leaving adhesive residue on the coating further demonstrating the strong bond of the adhesive to the coated film. No adhesive split was observed when the tape was removed from the uncoated sample.

Figure 2:
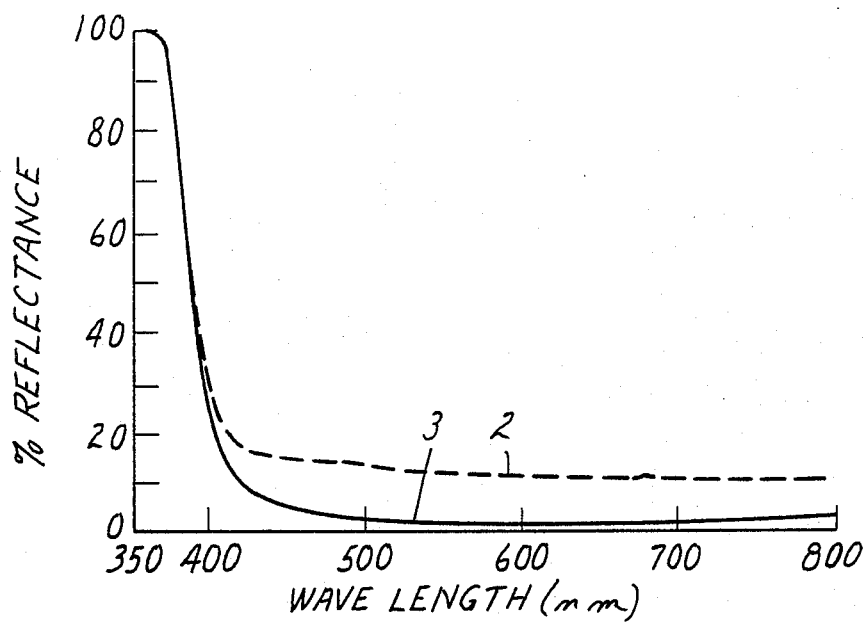
FIG. 2 is a plot of a curve 2 of the percentage of light reflected from an uncoated polyethylene terephthalate film substrate and of a curve 3 of a coated polyethylene terephthalate film substrate according to the invention.
Figure 3:
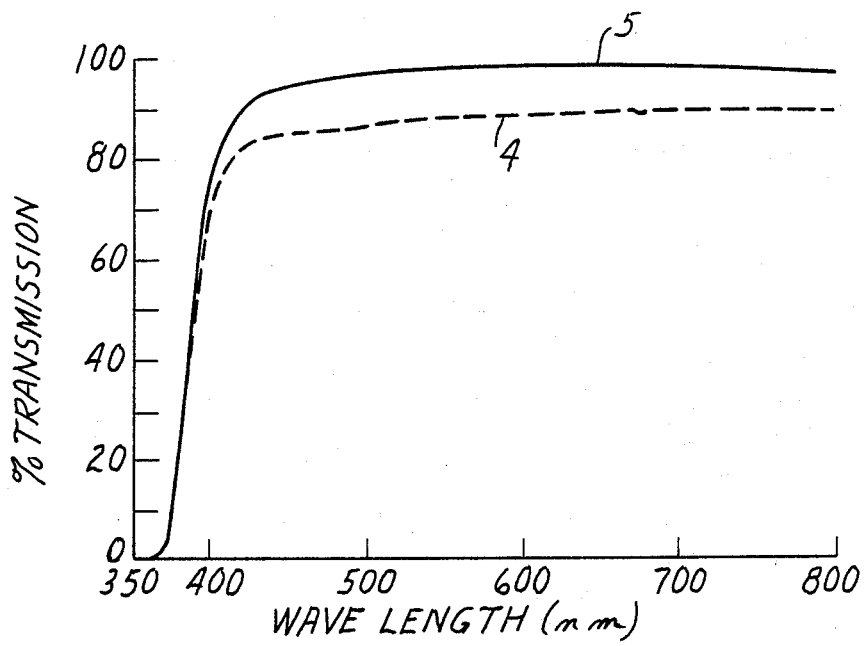
FIG. 3 is a plot of a curve 4 of the percentage of light transmitted through an uncoated polyethylene terephthalate film substrate and of a curve 5 of a coated polyethylene terephthalate film substrate according to the invention.

The antireflection and transmission properties of the film were measured using an IBM UV-VIS 9432 Spectrophotometer at wavelengths of from 350 to 800 nm. An uncoated sample of the film was also measured for comparative purposes. The results of these tests are shown in FIGS. 2 and 3. As can be seen from FIG. 2, the reflectance of the uncoated sample, curve 2, was about 12% at 600 nm, while the reflectance of the coated sample, curve 3, was about 2% at 600 nm. As can be seen from FIG. 3, the light transmission of the uncoated film, curve 4, was about 88% at 600 nm, while the light transmission of the coated sample, curve 5, was about 98% at 600 nm. This demonstrates the excellent reduction of reflectance and increase in transmission of light provided by the coating.

EXAMPLE 2

A coating solution was prepared by diluting colloidal silica (Nalco 2326) with ethanol to a concentration of 2.5% solids and adding 0.01% Tergitol TMN-6. The solution was coated on 0.1 mm thick polyethylene terephth-alate film using a rotogravure coating roll. The coated film was dried at 93° C. for three minutes. The resulting coating was porous, continuous, and about 100 nm thick. The coating was substantially similar to the coating shown in FIG. 1. The dried coating was observed to have good antireflection properties.

Samples of the coated film as well as samples of uncoated film were tested for adhesion using the modified ASTM Test Method D3330 described hereinabove. The uncoated film had an adhesion value of 189 g/cm tape width with no adhesive split from the tape. The coated sample had an adhesion value of 559 g/cm tape width. The tape did not remove the coating from the film, but exhibited adhesive split of the adhesive layer, again demostrating the excellent adhesion of the coating to the substrate and the excellent adhesion of the adhesive to the coating.

EXAMPLES 3–15

Various transparent polymeric sheet materials, as identified in Table 1, were coated by dipping the materials in a coating solution containing 1.5% colloidal silica (Nalco 2326) or by wiping the solution on each side of the sheet material with a tissue-wrapped glass rod and drying the coated sample.

TABLE 1

| Material | Type | Thickness (mm) |
| --- | --- | --- |
| A | polymethylmethacrylate (Rohm and Haas Co.) | 0.67 |
| B | polycarbonate (CR-39, PPG Inc.) | 3.12 |
| C | polycarbonate (Lexan, General Electric Co.) | 1.94 |
| D | cellulose acetate butyrate | 2.15 |

The following coating solutions were used to coat the various sheet materials:

| Solution I | |
| --- | --- |
| ethanol | 135 g |
| Nalco 2326 silica sol | 15 g |
| Tergitol TMN-6 | 0.15 g |
| Solution II | |
| water | 135 g |
| Nalco 2326 silica sol | 15 g |
| Tergitol TMN-6 | 0.3 g |

For each example, the substrate material, coating method, coating solution, and drying temperature, together with the resulting light transmission determined using an IBM UV-VIS 9432 Spectrophotometer at wavelengths of from 400 to 800 nm, are set forth in Table 2. Light transmission data for uncoated materials are also set forth in Table 2 for comparative purposes.

TABLE 2

| Example | Material | Coating Method | Coating Solution | Drying Temp. (°C.) | % Transmission at wavelengths (nm) | | | | | Average percent increase in Transmission |
| --- | --- | --- | --- | --- | --- | --- | --- | --- | --- | --- |
| | | | | | 400 | 500 | 600 | 700 | 800 | |
| 3 (Comp)* | A | none | — | — | 92.0 | 92.5 | 92.5 | 92.5 | 92.5 | — |
| 4 | A | dip | I | 80 | 91.5 | 93.5 | 94.5 | 95.5 | 95.5 | 2.0 |
| 5 | A | wipe | I | 80 | 96.5 | 94.8 | 94.7 | 95.3 | 95.6 | 3.2 |
| 6 (Comp) | B | none | — | — | 88.5 | 90.5 | 91.0 | 91.4 | 91.8 | — |
| 7 | B | wipe | II | 22 | 96.0 | 97.5 | 97.5 | 97.0 | 96.0 | 6.8 |
| 8 | B | wipe | II | 80 | 92.1 | 94.2 | 96.0 | 97.1 | 97.5 | 5.2 |
| 9 | B | wipe | I | 22 | 93.0 | 96.0 | 97.4 | 97.9 | 97.5 | 6.3 |
| 10 | B | wipe | I | 80 | 91.8 | 94.5 | 97.0 | 98.0 | 98.2 | 5.8 |
| 11 (Comp) | C | none | — | — | 91.7 | 92.0 | 92.0 | 92.1 | 92.1 | — |
| 12 | C | wipe | I | 80 | 94.1 | 92.6 | 94.1 | 96.2 | 98.0 | 3.3 |
| 13 (Comp) | D | none | — | — | 83.6 | 87.9 | 87.5 | 90.1 | 90.2 | — |
| 14 | D | dip | II | 22 | 87.1 | 93.8 | 93.7 | 96.2 | 96.1 | 6.3 |
| 15 | D | wipe | I | 80 | 86.0 | 90.4 | 89.1 | 91.8 | 92.8 | 2.5 |

*"Comp" denotes comparative examples.

As can be seen from the data in Table 2, the coatings provide an excellent increase in light transmission for each of the materials which were coated. Each coated sample exhibited at least two percent average increase in light transmission. The greatest increase in transmission was achieved on the CR-39 polycarbonate with the average percent increase in transmission for Example 7 being 6.8 percent.

Various modifications and alterations of this invention will become apparent to those skilled in the art without departing from the scope and spirit of this invention.

What is claimed is:

1. A coated article comprising a substrate having a coating of a continuous, gelled network of silica particles which coating is transparent, provides a substantially smooth surface is substantially uniform in thickness and is substantially permanently adhered to said substrate providing a 180° peelback value of at least about 500 g/cm.

2. The coated article of claim 1 wherein said silica particles have a primary particle size of less than about 200 Å.

3. The coated article of claim 1 wherein said silica particles have a primary particle size of less than about 70 Å.

4. The coated article of claim 1 wherein said coating is about 20 to 500 nm thick.

5. The coated article of claim 1 wherein said coating is prepared from a colloidal solution capable of providing a dried product having an open porosity of between about 25 and 70 percent.

6. The coated article of claim 1 wherein said coating contains up to about 20 weight percent water.

7. The coated article of claim 1 wherein said substrate is transparent.

8. The coated article of claim 7 wherein the transmission therethrough of normal incident light in the wavelength range of 400 to 800 nm is increased over the transmission through an uncoated substrate of the same composition.

9. The coated article of claim 8 wherein said average transmission is increased at least 2 percent.

10. The coated article of claim 10 wherein said coating is from about 70 to 250 nm thick.

11. The coated article of claim 8 wherein said coating has an index of refraction of between about 1.15 and 1.40.

12. The coated article of claim 8 wherein said substrate is polymeric.

13. The coated article of claim 12 wherein said substrate is polyester.

14. The coated article of claim 13 wherein said substrate is polyethylene terephthalate.

15. The coated article of claim 1 wherein said coating further comprises polymeric binder.

16. The coated article of claim 1 wherein said coating further comprises surfactant.

17. An article comprising a polymeric substrate having a layer of a continuous, gelled network of silica particles, said particles having an average primary particle size of less than about 70 Å and forming a layer of substantially uniform thickness between abpit 70 to 250 nm thick and providing a transparent coating having a substantially smooth surface and a 180° peelback value of at least about 500 g/cm.

18. The article of claim 17 wherein said gelled network is about 100 to 200 nm thick.

19. The article of claim 17 wherein said coating has an index of refraction between about 1.15 and 1.40.

20. The article of claim 17 wherein said gelled network is prepared from a colloidal solution capable of providing a dried product having an open porosity of from about 25 to 70 percent.

21. The article of claim 20 wherein said porosity is from about 30 to 60 percent.

22. The article of claim 17 wherein said gelled network contains up to about 20 weight percent water.

23. The article of claim 17 wherein said substrate is transparent.

24. The article of claim 17 wherein said substrate is polymeric.

25. The article of claim 24 wherein said substrate is polyester.

26. The article of claim 25 wherein said polyester is polyethylene terephthalate.

27. The article of claim 23 wherein the average transmission therethrough of normal incident light in the wavelength range of 400 to 800 nm is increased over the transmission through an uncoated substrate of the same material.

28. The article of claim 27 wherein said average transmission is increased at least 2 percent.

* * * * *

UNITED STATES PATENT AND TRADEMARK OFFICE
CERTIFICATE OF CORRECTION

PATENT NO. : 4,816,333

DATED : MARCH 28, 1989

INVENTOR(S) : ROGER W. LANGE, et al.

It is certified that error appears in the above-identified patent and that said Letters Patent is hereby corrected as shown below:

Col. 8, line 64, Claim 10. "10" should be --8--.

Col. 9, line 1, Claim 12. "8" should be --1--.

Col. 9, line 16, "abpit" should be --about--.

Signed and Sealed this

Tenth Day of October, 1989

*Attest:*

DONALD J. QUIGG

*Attesting Officer*    *Commissioner of Patents and Trademarks*

REEXAMINATION CERTIFICATE (3912th)

United States Patent [19]
Lange et al.

[11] B1 4,816,333
[45] Certificate Issued Nov. 2, 1999

[54] SILICA COATING

[75] Inventors: Roger W. Lange, Maplewood; Harold G. Sowman, Stillwater; Soon-Kun Kang, Oakdale, all of Minn.

[73] Assignee: Minnesosta Mining and Manufacturing Company, Saint Paul, Minn.

Reexamination Request:
No. 90/005,019, Jun. 16, 1998

Reexamination Certificate for:
Patent No.: 4,816,333
Issued: Mar. 28, 1989
Appl. No.: 06/910,250
Filed: Sep. 19, 1986

Certificate of Correction issued Oct. 10, 1989.

Related U.S. Application Data

[63] Continuation of application No. 06/694,945, Jan. 25, 1985, abandoned.
[51] Int. Cl.[6] ............................................. B32B 5/16
[52] U.S. Cl. ......................... 428/331; 428/332; 428/480
[58] Field of Search ................................... 428/331, 333, 428/480

[56] References Cited

U.S. PATENT DOCUMENTS

| | | |
|---|---|---|
| 2,366,516 | 1/1945 | Geffcken et al. . |
| 2,432,484 | 12/1947 | Moulton . |
| 2,445,238 | 7/1948 | Nicoll et al. . |
| 2,536,764 | 1/1951 | Moulton . |
| 2,601,123 | 6/1952 | Moulton . |
| 2,714,066 | 7/1955 | Jewett et al. . |
| 3,301,701 | 1/1967 | Baker et al. . |
| 3,380,876 | 4/1968 | Rusher . |
| 3,396,046 | 8/1968 | Landau . |
| 3,485,658 | 12/1969 | Iler . |
| 3,674,531 | 7/1972 | Shephard et al. . |
| 3,706,589 | 12/1972 | Fukuda et al. . |
| 3,833,368 | 9/1974 | Land et al. . |
| 3,914,469 | 10/1975 | Delano et al. . |
| 4,177,315 | 12/1979 | Ubersax . |
| 4,190,321 | 2/1980 | Dorer et al. . |
| 4,191,804 | 3/1980 | Weber ..................................... 428/409 |
| 4,230,765 | 10/1980 | Takahashi et al. . |
| 4,271,210 | 6/1981 | Yoldas . |
| 4,273,826 | 6/1981 | McCollister et al. . |
| 4,346,131 | 8/1982 | Yoldas . |
| 4,374,158 | 2/1983 | Taniguchi et al. . |
| 4,409,285 | 10/1983 | Swerdlow . |

FOREIGN PATENT DOCUMENTS

| | | |
|---|---|---|
| 58-126502 | 7/1983 | Japan . |
| 29561 | of 1905 | United Kingdom . |

OTHER PUBLICATIONS

Cathro et al., "Silica Low–Reflection Coating for Collector Covers, by a Dip–Coatings Process", *Solar Energy*, 32, 573–570 (1984).

Cathro et al., "Durability of Porous Silica Antireflection Coatings for Solar Collector Cover Plates", *Solar Energy*, 27, 491–496 (1981).

*Primary Examiner*—H. Thile

[57] ABSTRACT

A coated article having a substrate coated with a layer of silica particle is provided. The coating is substantially uniform in thickness, adheres aggressively to the substrate, and provides excellent antireflectin properties to the substrate.

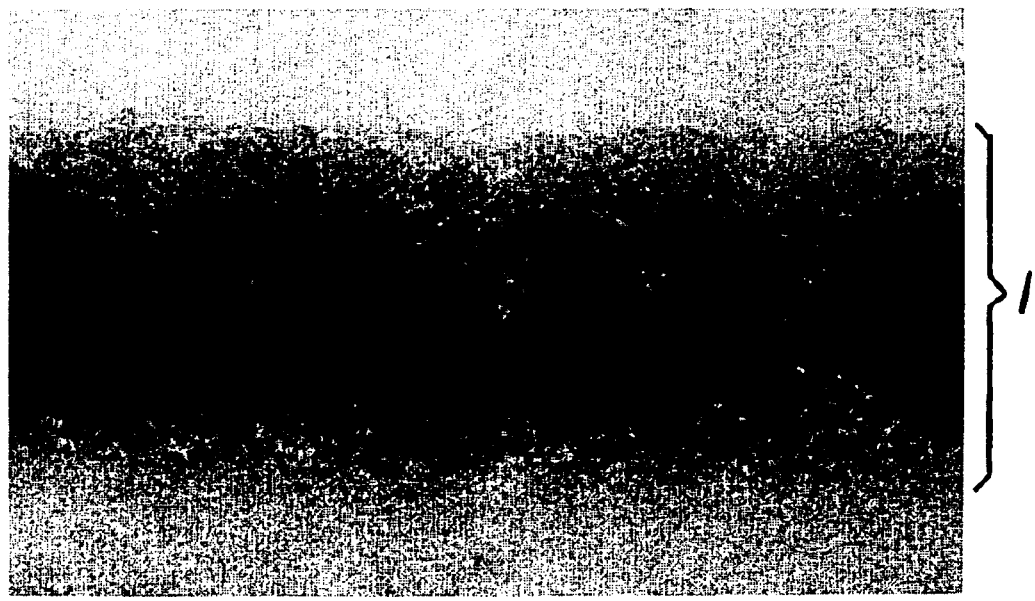

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 3–28 is confirmed.

Claim 2 is cancelled.

New claims 29–35 are added and determined to be patentable.

*29. A coated article comprising a substrate having a coating of a continuous, gelled network of silica particles, which coating is transparent, provides a substantially smooth surface, is substantially uniform in thickness, and is substantially permanently adhered to said substrate providing a 180° peelback value of at least about 500 g/m, wherein said silica particles have a primary particle size of less than about 200Å.*

*30. A coated article comprising a substrate which is a polymeric film having a coating of a continuous, gelled network of silica particles, which coating is transparent, provides a substantially smooth surface, is substantially uniform in thickness, and is substantially permanently adhered to said substrate providing a 180° peelback value of at least about 500 g/cm.*

*31. The coated article of claim 30 wherein said silica particles have a primary particle size of less than about 200 Å.*

*32. The coated article of claim 30 wherein said silica particles are derived from a sodium or ammonium stabilized silica sol.*

*33. The coated article of claim 1 wherein said silica particles are derived from a sodium or ammonium stabilized silica sol.*

*34. The coated article of claim 33 wherein the sol is an aqueous sol.*

*35. The coated article of claim 34 wherein the coating further comprises a surfactant.*

* * * * *